United States Patent [19]
Sharp et al.

[11] Patent Number: 5,270,071
[45] Date of Patent: Dec. 14, 1993

[54] REDUCED CALORIE FRUIT SPREADS

[75] Inventors: Susan E. Sharp, Somerset; Robert N. Antenucci, Hamilton, both of N.J.

[73] Assignee: McNeil-PPC, Inc., Milltown, N.J.

[21] Appl. No.: 900,643

[22] Filed: Jun. 18, 1992

[51] Int. Cl.$^5$ .......................... A23L 1/06; A23L 1/307
[52] U.S. Cl. .................................. 426/577; 426/548; 426/804
[58] Field of Search ................ 426/577, 804, 548, 639

[56] References Cited

U.S. PATENT DOCUMENTS

| | | | |
|---|---|---|---|
| 3,642,491 | 2/1972 | Schlatter | 426/577 |
| 3,692,541 | 9/1972 | Altieri et al. | 426/577 |
| 3,947,604 | 3/1976 | McGinley et al. | 426/577 |
| 4,370,354 | 1/1983 | Leipold | 426/577 |
| 4,496,603 | 1/1985 | Manabe et al. | 426/577 |
| 5,075,124 | 12/1991 | Horie | 426/577 |

FOREIGN PATENT DOCUMENTS

| | | | |
|---|---|---|---|
| 2084142 | 3/1990 | Japan | 426/577 |
| 3065149 | 3/1991 | Japan | 426/577 |

*Primary Examiner*—Jeanette Hunter
*Attorney, Agent, or Firm*—Charles J. Metz

[57] ABSTRACT

A reduced calorie fruit spread comprising the gelled product of:
a. water;
b. fruit or fruit flavoring;
c. sucralose high intensity sweetener;
d. low methoxy pectin or carrageenan;
e. carboxymethylcellulose;
f. guar gum; and
g. locust bean gum.

4 Claims, 8 Drawing Sheets

STABILITY OF REDUCED-CALORIE GRAPE SPREAD SWEETENED WITH SUCRALOSE

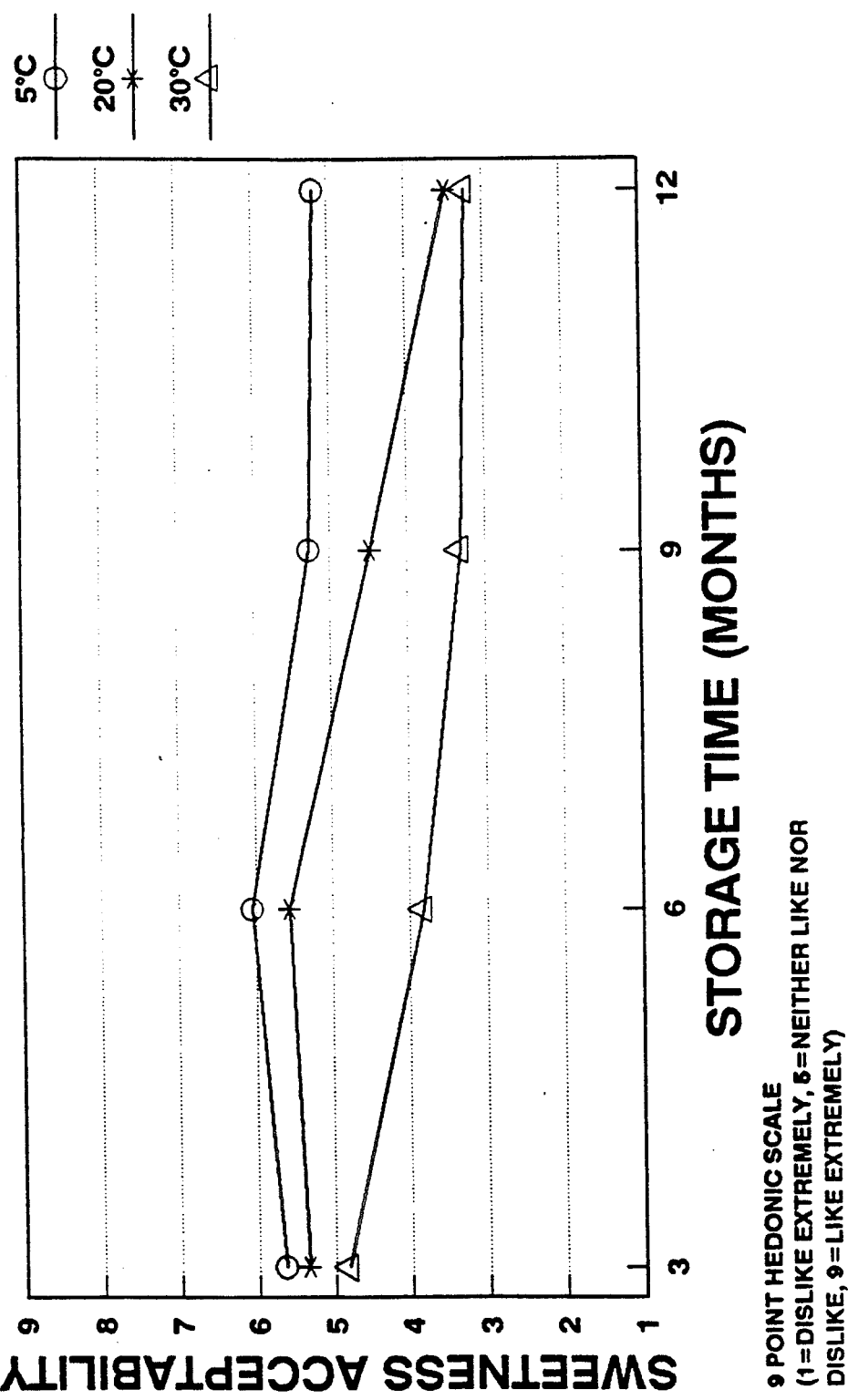

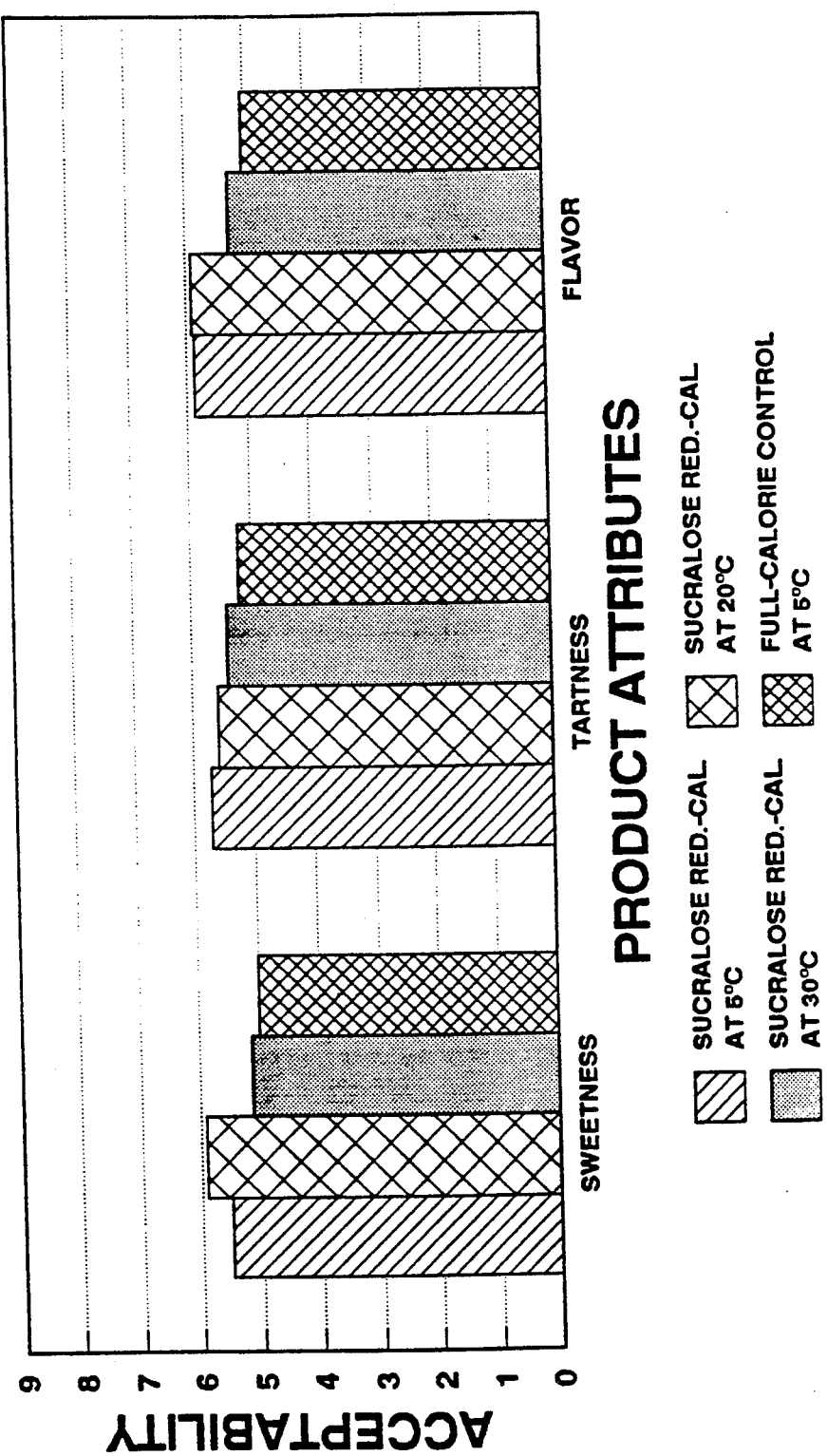

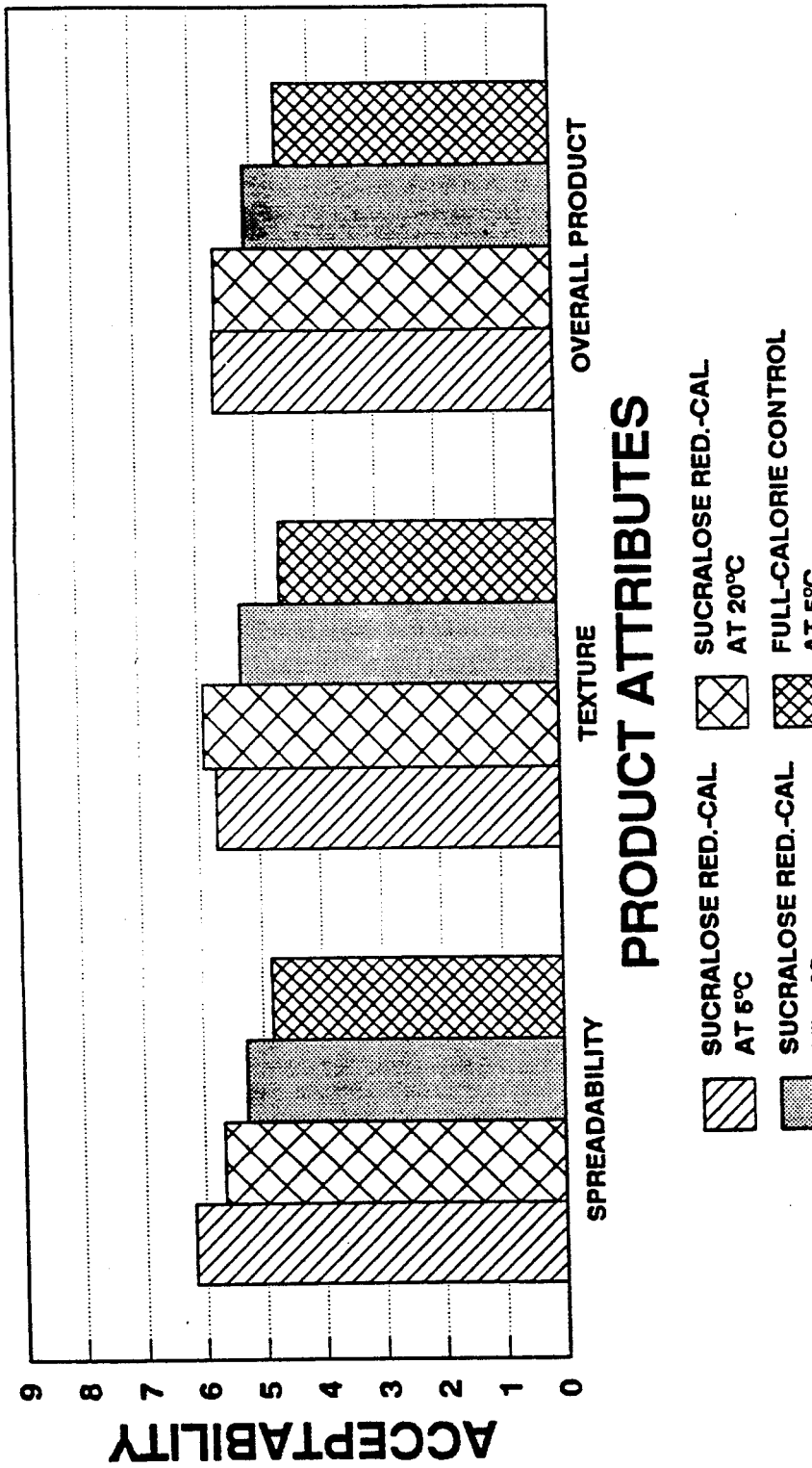

REDUCED CALORIE FRUIT SPREADS

The invention relates to a reduced calorie fruit spread containing sucralose, a high potency sweetener and a multi-component hydrocolloid mixture.

BACKGROUND OF THE INVENTION

Traditional reduced-calorie, low-solids fruit spread products are inherently low in sweetness intensity, poor in sweetness quality and possess a number of textural defects in comparison to their full-calorie counterparts. These defects are characterized by a grainy, brittle, thin texture which lacks the desired spreadability and mouthfeel associated with full-calorie, high-solids products. Carbohydrate sweeteners such as sucrose provide many of the desired textural and flavor attributes. Likewise, traditional low calorie, artificially sweetened fruit spread products possess many of the same textural and flavor defects as the low-sugar products.

High methoxy pectins are used in conventional full calorie high-solids fruit spread products. These pectins are stable to low pH and high temperature conditions; however, they do not gel in the absence of high solids. Most artificially sweetened and low-sugar fruit spread products (which have lower solids content than full calorie spreads because of the reduced sugar content) utilize low methoxy pectin (set with calcium) or carrageenan as the gelling agent. However, textural defects are apparent in products formulated with these gelling agents.

The use of conventional hydrocolloid systems such as carrageenan and low methoxy pectin in reduced calorie (low solids) fruit spreads only provide a gel structure of poor body and mouthfeel. Conventional low-solids formulations do not match the textural quality of high-solids products.

Over the past few years, several reduced-calorie aspartame sweetened fruit spreads have become commercially available. There is significant room for improvement in the storage stability and organoleptic properties of these products. Traditional full calorie fruit spreads usually have pH values of about 3.0-3.2. The commercially available aspartame fruit spreads have pH values of about 3.6-3.7, because at the traditional pH values aspartame would lack sufficient stability to have a reasonable shelf life. However, at the higher pH of 3.6-3.7, for grape products in particular, the characteristic tartness/flavor profile exhibited by traditional products at a pH of 3.0-3.2 is lacking. Also, at the higher pH values, color stability is decreased for certain fruit spreads such as grape jelly. The presently available aspartame-containing spreads, even at the higher pH, are less than fully acceptable because of poor sweetener stability, poor flavor, and (regardless of the pH) poor textural properties.

In the U.S., saccharin also is available in a number of reduced calorie fruit spreads. Saccharin products have good stability; however, they often have a bitter, lingering aftertaste and poor textural qualities.

It is an objective of the invention to provide reduced-calorie, reduced-solids fruit spread products which are comparable in overall organoleptic quality to full-calorie, high-solids products. This objective is accomplished by use of the high-potency sweetener, sucralose, and a multi-component gum system in combination. Sucralose provides the desired sweetness quality and is stable to typical processing and storage conditions. The multi-component hydrocolloid system provides the desired textural attributes.

BRIEF DESCRIPTION OF THE INVENTION

The invention provides a reduced calorie fruit spread prepared from a composition that comprises:
a. water;
b. fruit or fruit flavoring;
c. sucralose high intensity sweetener;
d. low methoxy pectin or gum carrageenan;
e. carboxymethylcellulose;
f. guar gum; and
g. locust bean gum.

In addition, the fruit spread of the invention may contain one or more buffering agents, acids, preservatives, and other similar materials that are normally employed in fruit spreads.

DESCRIPTION OF THE DRAWINGS

FIG. 6 is a graph of sweetness acceptability versus storage time of a commercial fruit spread sweetened with aspartame at different temperatures for storage periods of up to 12 months;

FIG. 7 is a graph of sweetness, tartness, and flavor of a fruit spread of the invention after storage for one year at 5° C., 20° C. and 30° C., compared with the sweetness, tartness, and flavor of a full calorie control fruit spread after storage for one year at 5° C.; and FIG. 8 is a graph of spreadability, texture, and overall product quality of a fruit spread of the invention after storage for one year at 5° C., 20° C. and 30° C., compared with the spreadability, texture, and overall product quality of a full calorie control fruit spread after storage for one year at 5° C.

DETAILED DESCRIPTION OF THE INVENTION

Figure 1:
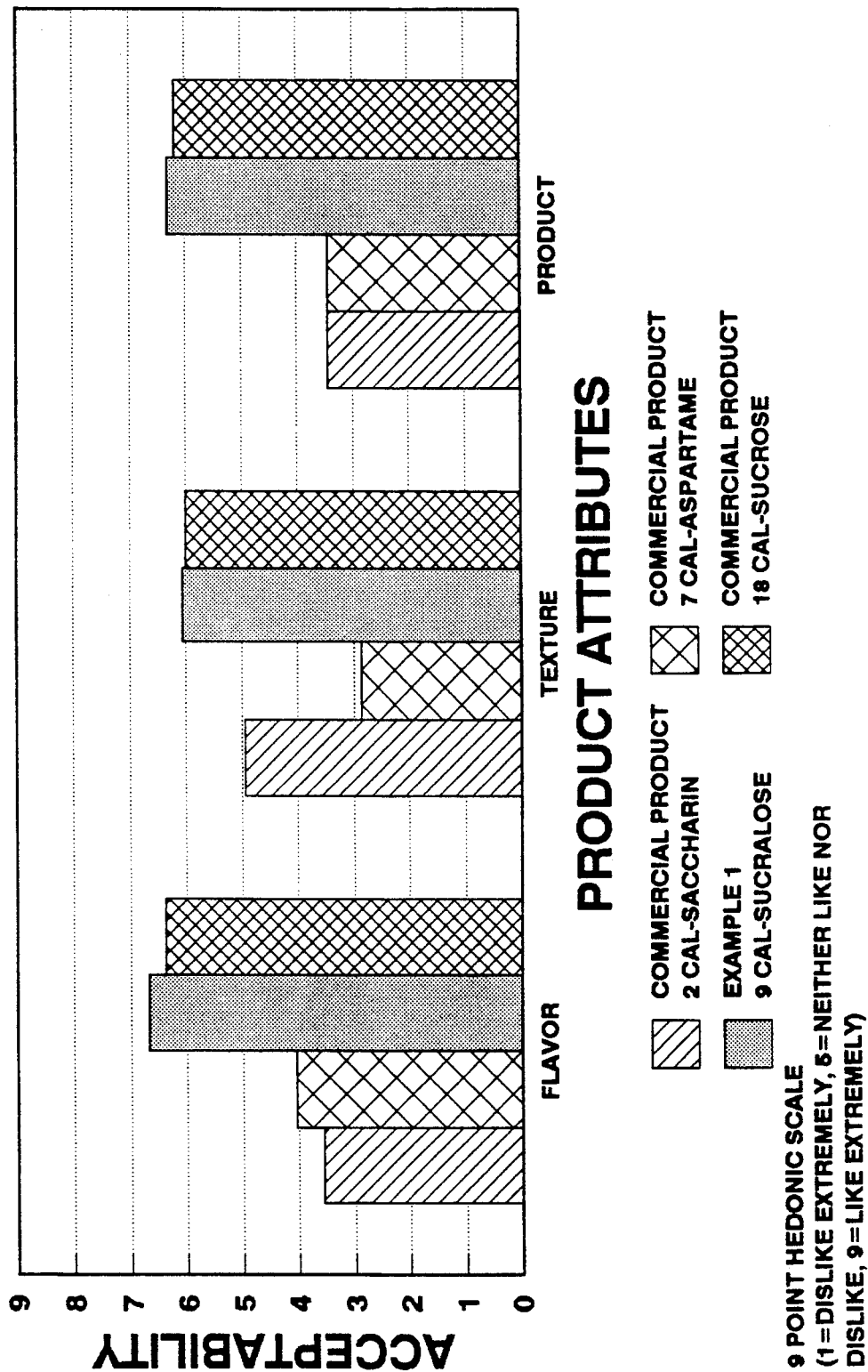
FIG. 1 is a graph showing the flavor, texture, and overall product quality evaluation of a fruit spread of the invention compared with commercial products at time zero.

It is the principal objective of this invention to provide reduced-calorie, low-solids fruit spread products which are similar in sensory (sweetness intensity, quality, flavor, etc.), visual (color, clarity, gloss, etc.), and textural (firmness, body, mouthfeel, spreadability, etc.) properties to full-calorie, high-solids fruit spread products. Such fruit spread products include jams, jellies, marmalades, preserves and related products. As a general rule, the fruit spreads of the invention will have not more than about 9 calories per teaspoon (equivalent to about 1.5 calories per gram).

The use of sucralose and a multi-component gum system in combination provides reduced-calorie, reduced solids fruit spreads similar in quality to a full-calorie, high solids product. The following product characteristics are necessary to achieve the intended product quality: 1) Acceptable sweetness quality and sweetener stability; 2) Acceptable texture quality and stability; 3) Acceptable color and stability (pH dependent); and 4) Significant reduction in caloric contents (consequently, reduction in carbohydrate solids content).

Satisfaction of the four criteria listed above is required to produce a reduced calorie fruit spread of acceptable quality. It is critical that all criteria be met since failure to meet any of the four will significantly alter the product quality in an adverse manner. These characteristics are provided by employing sucralose and the multi-component gum system described in detail below.

The required ingredients employed in preparing the reduced calorie fruit spreads of the invention are the following:
a. water;
b. fruit or fruit flavoring;
c. sucralose high intensity sweetener;
d. low methoxy pectin or gum carrageenan;
e. carboxymethylcellulose;
f. guar gum; and
g. locust bean gum.

The several ingredients will be discussed in turn, below:

Water is employed in the fruit spreads of the invention in proportions of from about 30% to about 75%, by weight. (Unless otherwise stated, all percentages are by weight, based on the total weight of the formulation.) The proportion of water in the reduced-calorie fruit spreads of the invention is significantly higher than in full-calorie jams and jellies. Water provides bulk and the medium from which the gel is made.

The spreads of the invention contain fruit or fruit flavoring or both, depending on the type of spread being produced. The principles here are well understood in the art. For instance, in the preparation of grape jelly, grape juice or grape juice concentrate and grape flavor essence can be used; in preparing strawberry jam, whole strawberries may be used, perhaps in combination with strawberry flavoring; in preparing orange marmalade, shredded orange skin, orange juice, and pieces of orange may be used. The principles employed in the selection of the type and proportion of fruit and fruit flavoring are analogous to those that are employed in preparing full calorie fruit spreads, and are known in the art. As a general rule, the fruit or fruit juice will be employed in an amount within the range of from about 15 to 30%, by weight, and fruit flavor concentrate will usually be employed in an amount within the range of from about 0.5 to 3%, by weight.

The nonnutritive high intensity sweetener that is used in the invention is sucralose, whose chemical name is 4-chloro-4-deoxy-α-D-galactopyranosyl-1,6-dichloro-1,6-dideoxy-β-D-fructofuranoside. The nature and preparation of sucralose is known in the art. See, for example, Walkup et al., U.S. Pat. No. 4,980,463 and references cited therein. Sucralose is used in the fruit spread of the invention in an amount sufficient to impart the desired degree of sweetness, which amount will usually be within the range of from about 0.05% to about 0.4%, and preferably, from about 0.1% to about 0.35%. When sugar or other sweeteners (in a reduced amount, compared to full calorie spreads) are included in the formulation, less sucralose will be employed.

The fruit spreads of the invention contain low methoxy pectin or carrageenan. Pectins are articles of commerce whose use in the food industry is well known. Pectins are carbohydrate materials that are derived from fruits, and are considered to be long-chain, partially methylated, polygalacturonic acid chains having a large molecular weight. Low methoxy "LM" pectins are pectins that have a degree of methylation below 50%. The gelling mechanism of LM pectins differs substantially from that of high methoxy "HM" pectins. To obtain gel formation in a system with LM pectin, the presence of a small amount (e.g., from about 0.005% to about 0.1% of the weight of LM pectin in the fruit spread recipe) of calcium ion in the system is normally required. (High methoxy pectin requires significant proportions of sugar, as well as a pH of from about 3.0 to 3.2, for gel formation.) LM pectin is desirable for use in this invention, especially in the preparation of grape spreads, because LM pectins are stable at lower pH's (3.0), especially when exposed to elevated temperature processing conditions. It is desired to reduce the pH of the product to about 3.0 to prevent degradation of the natural anthocyanin pigments (purple/red) contained in grapes; such degradation results in the formation of an undesirable brown color. Therefore, formulating at pH 3.0 and using LM pectin in the grape spreads of the invention produces a product that is stable under typical processing and storage conditions throughout the expected shelf-life. The LM pectin is used in a proportion of from about 0.85 to 1.25%, by weight, in the grape spreads of the invention.

In formulating fruit spreads other than grape, such as strawberry, raspberry, orange, etc., jams and jellies, which may be formulated at higher pH values (e.g., pH's of 3.6–3.7), carrageenan (as well as LM pectin) may be used as the gelling agent. Carrageenan is also an article of commerce whose use in the food industry is well known. It is a polysaccharide derived from a seaweed known as Irish moss. Carrageenan is ordinarily used in proportions of from about 0.45 to 0.50%, by weight.

The major novelty of the invention resides in the use of a mixture of carboxymethylcellulose, guar gum, and locust bean gum. The combination of these three materials imparts desirable textural properties to a LM pectin or to a carrageenan gel. These three materials are articles of commerce and their use in the food industries is well known. Carboxymethylcellulose (often referred to as "CMC") is prepared by treating cellulose with sodium hydroxide and then reacting it with sodium monochloroacetate. Food grade CMC is used in the fruit spreads of the invention in proportions of from about 0.15% to about 0.6%, by weight. Guar gum is a galactomannan polysaccharide derived from the guar plant. It is used in the fruit spreads of the invention in proportions of from about 0.05% to about 0.60%, by weight. Locust bean gum is another galactomannan that is derived from the seed of the carob tree. It is used in the fruit spreads of the invention in proportions of from about 0.005% to about 0.10%, by weight.

The fruit spreads can be produced by procedures that are analogous to those that are known in the art. The examples, below, contain illustrative methods of preparation. One point needs to be emphasized. As is illustrated below in the Examples, it is important that the several gums that are used in the invention be dispersed using high shear agitation. (Traditional processing of full-calorie fruit products does not require high shear mixing.) All other processing steps are similar to those that are known in the art.

The examples below illustrate the invention:

EXAMPLE 1

Grape Jelly Reduced Calorie—9 Calorie

A 50% calorie-reduced sucralose sweetened grape spread was prepared in accordance with the principles of the invention. This fruit spread contained 9-Cal./tsp., whereas a full-calorie grape jelly typically contains 17-18 Cal./tsp. The sucralose sweetened grape spread was formulated to contain 40% soluble solids, to have a pH of 3.0-3.2, and to be iso-sweet with a commercial full-calorie grape jelly. Ingredient and processing information are shown below.

| PRODUCT FORMULA | |
|---|---|
| INGREDIENTS | PERCENTAGE (WET WT.) |
| Water | 50.90 |
| Sucrose | 25.00 |
| Grape Juice Concentrate | 19.00 |
| Grape Essence | 1.25 |
| Natural Grape Flavor | 1.00 |
| LM Pectin | 0.85 |
| Phosphoric Acid | 0.70 |
| Potassium Sorbate | 0.35 |
| Sodium Hexametaphosphate | 0.25 |
| Citric Acid | 0.20 |
| Sucralose | 0.16 |
| Carboxymethylcellulose | 0.20 |
| Guar Gum | 0.12 |
| Locust Bean Gum | 0.01 |
| Calcium Chloride | 0.01 |
| TOTAL | 100.00 |

| INGREDIENT SOURCES | | |
|---|---|---|
| Grape Juice Concentrate | 68° Brix | Welch's |
| Sucrose | Fine Granular | Amstar |
| Water | Distilled, Deionized | |
| Grape Essence | 150 Fold | Great Lakes |
| Natural Grape Flavor | #5-8798 | Bush Boake Allen |
| Phosphoric Acid | 25% Solution | Rhone Poulenc |
| Potassium Sorbate | 20% Solution | Pfizer |
| Sodium Hexametaphosphate | | Rhone Poulenc |
| Citric Acid | 50% Solution | Pfizer |
| Sucralose | 25% Liquid Concentrate | McNeil Specialty Products Co. |
| Carboxymethylcellulose | #7H3SF | Aqualon |
| Guar Gum | FG.1.HV | Colony Import & Export |
| LM Pectin | LM 104-AS | Hercules |
| Calcium Chloride | Dihydrate | Mallinckrodt |

Preparation Procedure:

Equipment:
 High Shear Mixer
 Hot Plate Heating Apparatus

1. Dry blend LM pectin, carboxymethylcellulose, guar gum, locust bean gum and sodium hexametaphosphate.
2. Dissolve gum blend mixture in boiling water using high shear mixer.
3. Slowly add sucrose to gum blend.
4. Slowly add grape juice concentrate (68° Brix).
5. Add sucralose and sorbate solutions.
6. Add grape essence, calcium chloride and grape flavor.
7. Add phosphoric and citric acid solutions.
8. Standardize batch to 100% yield with water.
9. Hot fill into jars (165° F. minimum).

* Maintain constant agitation and minimum temperature, 165° F., throughout process.

Approximate Specifications pH: 3.0-3.2
Brix: 40.0
$A_2$: 0.92

The grape jelly product of Example 1 was evaluated and compared to a full calorie grape jelly and commercial low calorie grape spreads containing aspartame and saccharin, in accordance with the following procedures:

Storage Stability Studies

The sweetener concentration and organoleptic acceptability of (1) the 9-calorie sucralose-sweetened spread of Example 1, (2) a commercially available 7-calorie aspartame-sweetened grape jelly, and (3) a full-calorie (18 calorie) sugar-sweetened grape spread were stored at 5° C., 20° C., and 30° C. for one year. The grape spreads were examined at 0, 3, 6, 9, and 12 months for sweetener concentration and 3, 6, 9, and 12 months for organoleptic acceptability.

Sensory Evaluation

Descriptive sensory analysis and acceptance testing were used to evaluate the sensory attributes of the reduced-calorie sucralose sweetened grape spread compared with commercially available full-calorie and aspartame sweetened reduced-calorie grape spreads. Sensory testing also was used to evaluate the acceptability of the stored products. Twenty to thirty naive panelists participated in the evaluations. Panelists were asked to rate the spreads for sweetness intensity, off-flavor intensity, and sweet aftertaste intensity, using a 100 point unstructured line scale. Panelists also were asked to rate the acceptability of the product using a nine-point hedonic scale (1=dislike extremely, 5=neither like nor dislike, 9=like extremely). These evaluations included ratings for sweetness acceptability, liking for overall flavor, liking for overall texture, liking for overall product, and liking for spreadability.

Analytical Methods

To determine chemical stability, samples of the sucralose spread were extracted using methanol and analyzed by HPLC, using a refractive index detector. For the aspartame spread, approximately three grams of sample was filtered, using Millipore's 3000 molecular weight cutoff ultrafilter (catalog #SK1M404J9, Millipore Corporation, Bedford, Mass.), and the filtrate analyzed by HPLC using a UV detector at 214 nm.

Apparatus: HPLC (Waters Associates system equipped with Waters 490 Differential Refractometer, Waters 712 autosampler, and Waters 410 UV detector, Waters Chromatography, Milford, Mass.). Data acquisition station: PE Nelson Turbochrome 3, (PE Nelson, Cupertino, Calif.).

Sensory and Stability Studies

Figure 2:
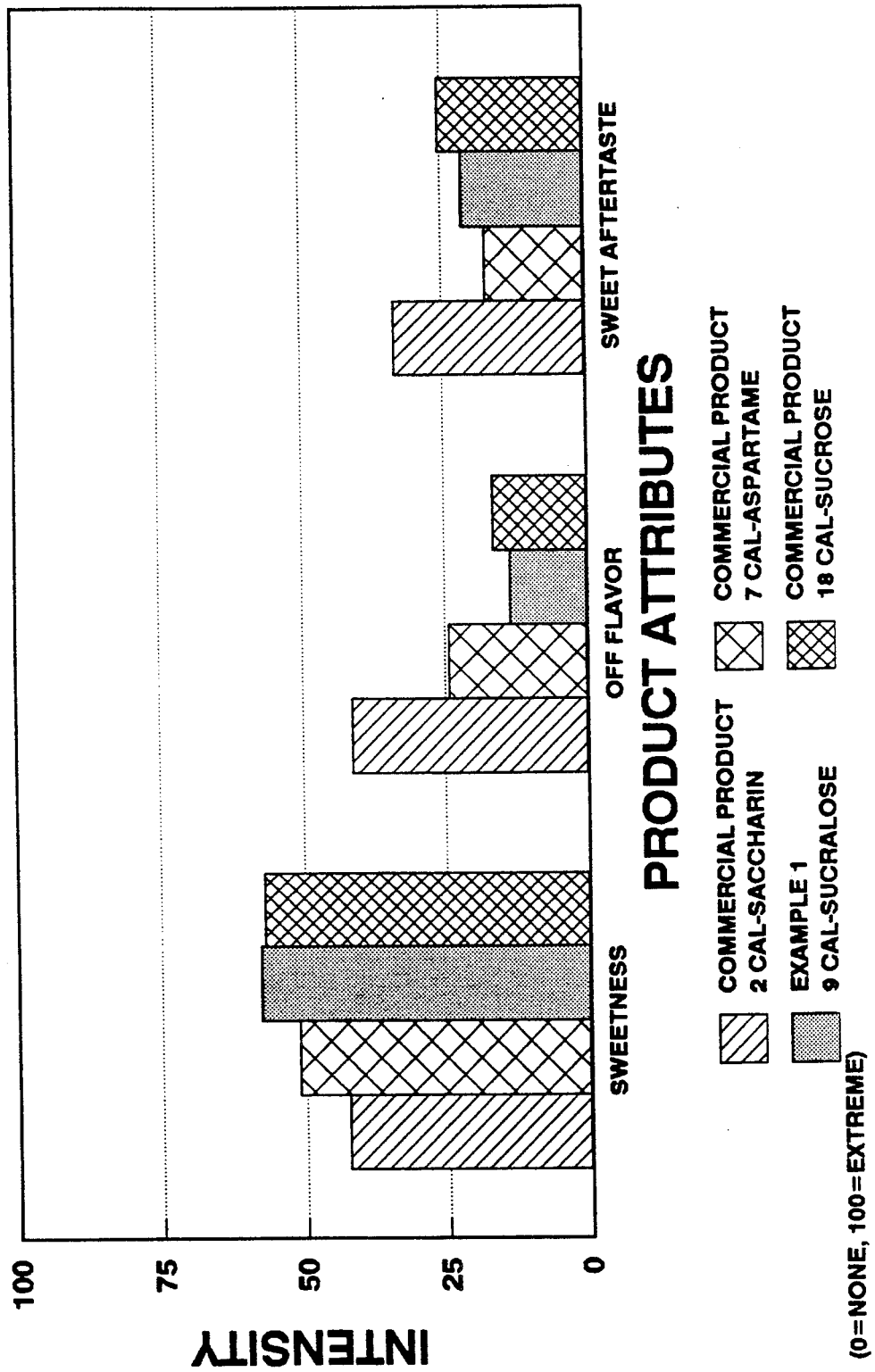
FIG. 2 is a graph showing the sweetness, off flavor, and sweet aftertaste evaluation of a fruit spread of the invention compared with commercial products at time zero.

The organoleptic properties of the reduced-calorie grape spread sweetened with sucralose were compared with commercially available reduced-calorie and full-calorie products at time-0. Results are shown in FIGS. 1 and 2. At time-0, the sucralose sweetened reduced-calorie grape spread was comparable to the commercial full-calorie grape jelly for all product attributes and scored numerically higher for flavor, texture, and overall product acceptability than the saccharin and aspartame sweetened reduced-calorie grape spreads. As shown in FIG. 2, the sweetness and off flavor intensity of the sucralose product was similar to the commercial full-calorie product.

Figure 3:
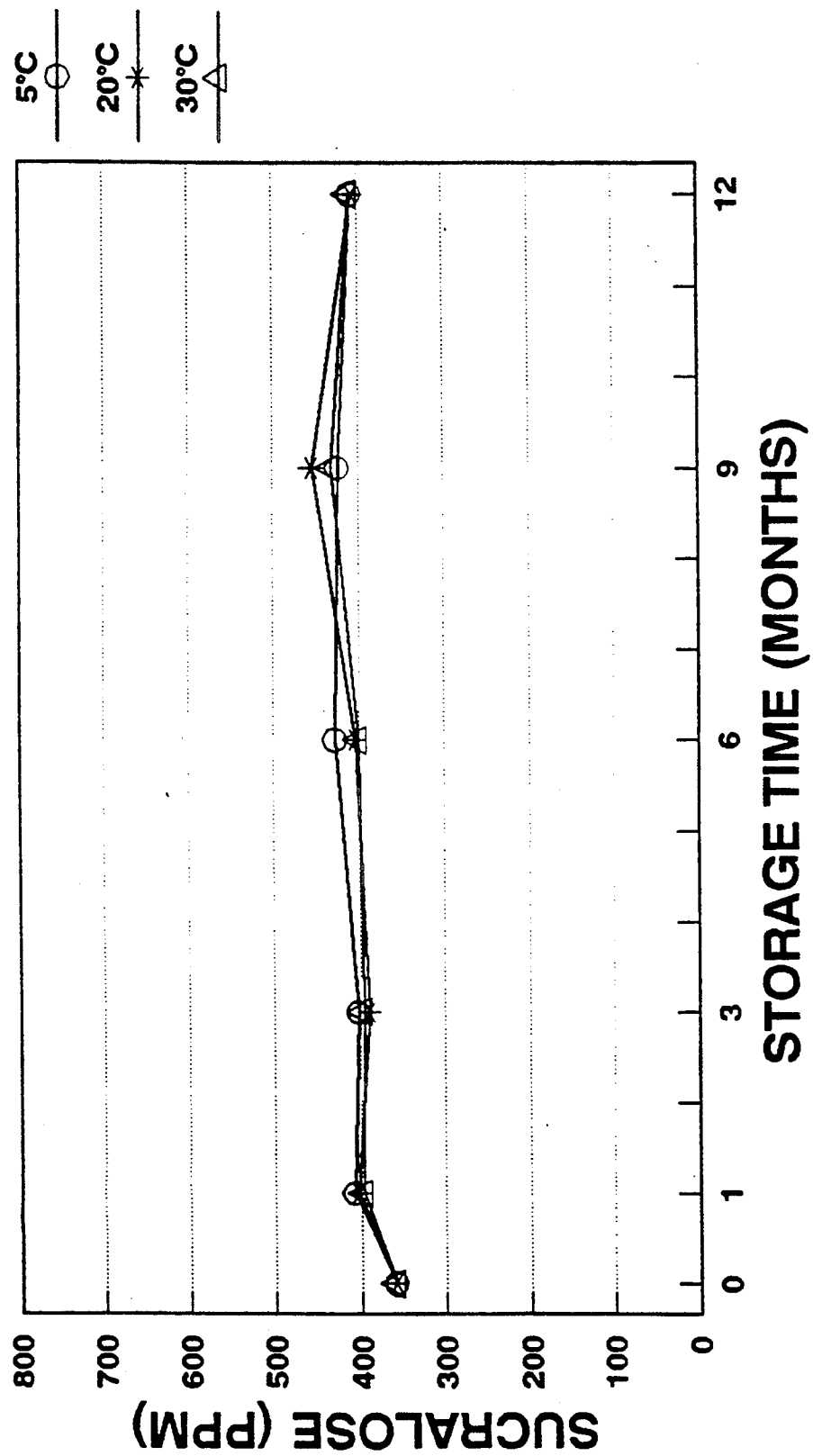
FIG. 3 is a graph of sucralose content versus storage time of a fruit spread of the invention at different temperatures for storage periods of up to 12 months.
Figure 4:
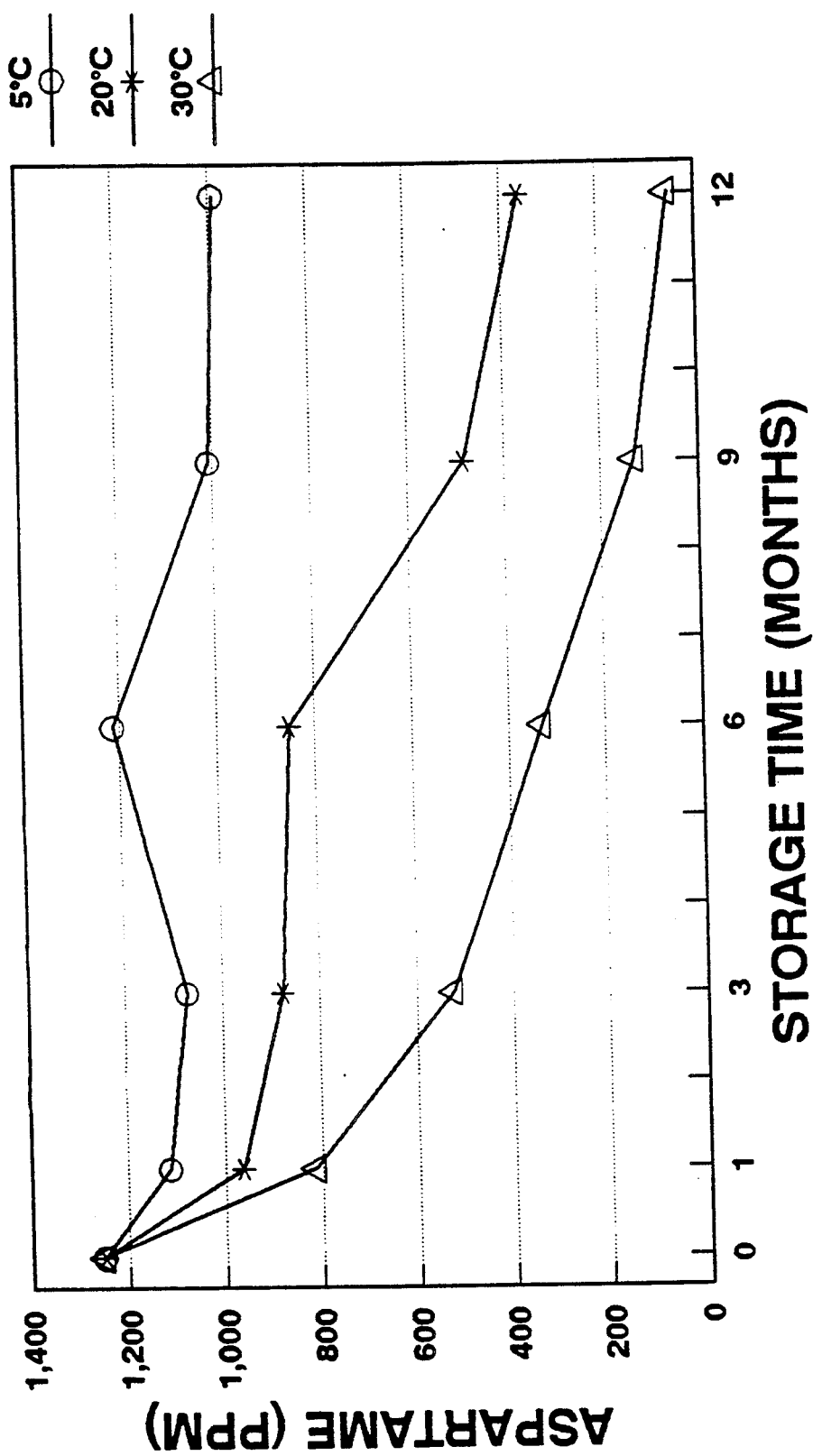
FIG. 4 is a graph showing aspartame content versus storage time of a commercial fruit spread sweetened with aspartame at different temperatures for storage periods of up to 12 months.

Sucralose stability is shown in FIG. 3. No change in sucralose concentration was measured over the one year storage period at any temperature. After one year of storage at 5° C., 20° C., and 30° C., aspartame losses of 20, 70, and 95% respectively, were measured (FIG. 4).

Figure 5:
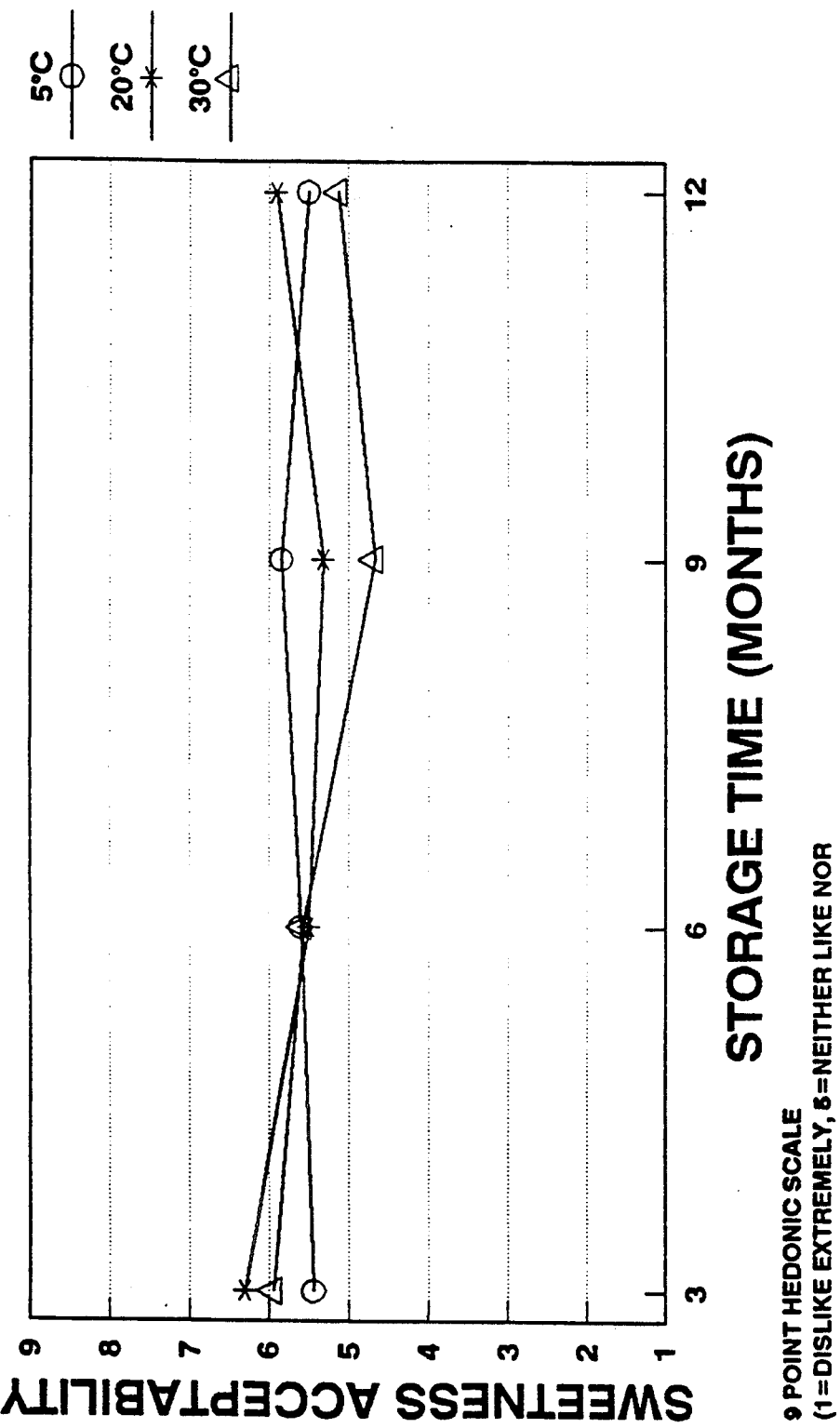
FIG. 5 is a graph of sweetness acceptability versus storage time of a fruit spread of the invention at different temperatures for storage periods of up to 12 months.

The analytical stability results were supported by sensory stability testing. During the one year storage period, perceived sweetness acceptability of the sucralose sweetened product remained constant (FIG. 5). Products sweetened with aspartame and stored at 30° C. for six months showed a statistically significant decrease in perceived sweetness acceptability compared with samples stored at 5° C. After nine months, the aspartame product stored at room temperature showed a significant decrease in perceived sweetness acceptability compared with the 5° C. sample. At one year, the aspartame products stored at 20° C. and 30° C. were rated in the "dislike moderately" range of the hedonic scale for sweetness acceptability (FIG. 6). Sensory and sweetener stability results demonstrate the excellent stability of sucralose in a reduced-calorie grape spread.

A comparison of the sensory stability attributes of sucralose sweetened reduced-calorie grape spreads and a full-calorie control grape jelly is shown in FIGS. 7 and 8. Sucralose sweetened products stored for one year at 5° C., 20° C., and 30° C. were comparable for sweetness, tartness, flavor, spreadability, texture, and overall product acceptability to a full-calorie control product stored at 5° C.

Sucralose sweetened, reduced-calorie grape spreads showed better organoleptic properties than commercially available, aspartame or saccharin sweetened reduced-calorie grape spreads. Sucralose sweetened reduced-calorie grape spreads developed showed better organoleptic and stability properties than commercially available aspartame sweetened reduced-calorie grape spreads over the expected shelf-life of the product.

The results demonstrate that the sucralose-sweetened grape spreads of the invention are comparable to a full-calorie commercial grape jelly.

EXAMPLE 2

Grape Jelly Reduced Calorie—2 Calorie

| PRODUCT FORMULA | |
|---|---|
| INGREDIENTS | PERCENTAGE (WET WT.) |
| Water | 74.01 |
| Grape Juice Concentrate | 19.00 |
| Natural Grape Flavor | 2.00 |
| Grape Essence | 1.25 |
| LM Pectin | 1.25 |
| Phosphoric Acid | 0.80 |
| Potassium Sorbate | 0.35 |
| Sucralose | 0.34 |
| Carboxymethylcellulose | 0.30 |
| Sodium Hexametaphosphate | 0.25 |
| Citric Acid | 0.20 |
| Guar Gum | 0.15 |
| Locust Bean Gum | 0.05 |
| Calcium Chloride | 0.05 |
| TOTAL | 100.00 |

| PRODUCT FORMULA | | |
|---|---|---|
| INGREDIENT SOURCES | | |
| Grape Juice Concentrate | 68° Brix | Welch's |
| Sucrose | Fine Granular | Amstar |
| Water | Distilled, Deionized | |
| Grape Essence | 150 Fold | Great Lakes |
| Natural Grape Flavor | #5-8798 | Bush Boake Allen |
| Phosphoric Acid | 25% Solution | Rhone Poulenc |
| Potassium Sorbate | 20% Solution | Pfizer |
| Sodium Hexametaphosphate | | Rhone Poulenc |
| Citric Acid | 50% Solution | Pfizer |
| Sucralose | 25% Liquid Concentrate | McNeil Specialty Products Co. |
| Carboxymethylcellulose | #7H3SF | Aqualon |
| Guar Gum | FG.1.HV | Colony Import & Export |
| LM Pectin | LM 104-AS | Hercules |
| Calcium Chloride | Dihydrate | Mallinckrodt |
| Locust Bean Gum | FL 50—50 | Hercules |

Preparation Procedure

Equipment:
High Shear Mixer
Hot Plate Heating Apparatus

1. Dry blend LM pectin, carboxymethylcellulose, guar gum, locust bean gum and sodium hexametaphosphate.
2. Dissolve gum blend mixture in boiling water using high shear mixer.
3. Slowly add grape juice concentrate (68° Brix).
4. Add sucralose and sorbate solutions.
5. Add grape essence, calcium chloride and grape flavor.
6. Add phosphoric and citric acid solutions.
7. Standardize batch to 100% yield with water.
8. Hot fill into jars (165° F. minimum).

* Maintain constant agitation and minimum temperature, 165° F., throughout process.

Approximate Specifications pH: 3.0–3.2
Brix: 16.0
$A_w$: 0.95

EXAMPLE 3

Strawberry Jam Reduced Calorie—9 Calorie

| PRODUCT FORMULA | |
|---|---|
| INGREDIENTS | PERCENTAGE (WET WT.) |
| Sucrose | 36.000 |
| Water | 33.605 |
| IQF Whole Strawberries | 27.500 |
| Natural Strawberry Flavor | 1.000 |
| Carrageenan | 0.450 |
| Potassium Sorbate | 0.350 |
| Guar Gum | 0.270 |
| Carboxymethylcellulose | 0.220 |
| Sucralose | 0.110 |
| Pectin | 0.100 |
| Caramel Color | 0.100 |
| Ascorbic Acid | 0.100 |
| Sodium Hexametaphosphate | 0.100 |
| Malic Acid | 0.050 |
| Locust Bean Gum | 0.025 |
| FD & C RED | 0.020 |

-continued

| PRODUCT FORMULA | | |
|---|---|---|
| TOTAL | 100.000 | |
| INGREDIENT SOURCES | | |
| Sucrose | Fine Granular | Amstar |
| Water | Distilled, Deionized | |
| Whole Strawberries | IQF | Smuckers |
| Strawberry Flavor | #5291099 | Comax Manufacturing |
| Kappa Carrageenan | Genugel UE | Hercules |
| Potassium Sorbate | 20% Solution | Pfizer |
| Guar Gum | SCM | TIC Gums |
| Carboxymethylcellulose | #7H3SF | Aqualon |
| Sucralose | 25% Liquid Concentrate | McNeil Specialty Products Co. |
| Pectin | Mexpectin SS200 | Grindsted Products |
| Caramel Color | #RT-325 | Sethness |
| Ascorbic Acid | 10% Solution | Pfizer |
| Sodium Hexametaphosphate | | Rhone Poulenc |
| Malic Acid | 50% Solution | Pfizer |
| Locust Bean Gum | #FL 50—50 | Hercules |
| FD & C RED | #40, 10% Solution | Crompton & Knowles |

Preparation Procedure

Equipment:
  High Shear Mixer
  Hot Plate Heating Apparatus

1. Combine IQF strawberries and sucrose, heat slowly to boil—stirring constantly, and hold for 1 minute.
2. Dry blend carrageenan, guar gum, carboxymethylcellulose, pectin, locust bean gum and sodium hexametaphosphate.
3. Dissolve dry blend mixture in boiling water using high shear mixer.
4. Add sucralose, sorbate solution and coloring agents.
5. Add strawberry flavor.
6. Add strawberry/sucrose mixture prepared in Step 1.
7. Add ascorbic and malic acids.
8. Standardize batch to 100% yield with water.
9. Hot fill into jars (165° F. minimum).

* Maintain constant agitation and minimum temperature, 165° F., throughout process.

Approximate Specifications pH: 3.6–3.7
Brix: 40.0
$A_w$: 0.92

EXAMPLE 4

2-Calorie Strawberry Jam Formulation

| INGREDIENTS | PERCENTAGE (WET WT.) |
|---|---|
| Water | 60.610 |
| IQF Whole Strawberries | 22.500 |
| Fructose | 7.500 |
| Strawberry Juice Concentrate | 4.750 |
| Natural Strawberry Flavor | 1.000 |
| Ascorbic Acid | 1.000 |
| Kappa Carrageenan | 0.500 |
| Carboxymethylcellulose | 0.500 |
| Guar Gum | 0.450 |
| Potassium Sorbate | 0.350 |
| Sucralose | 0.310 |
| Pectin | 0.300 |

-continued

| | | |
|---|---|---|
| Sodium Hexametaphosphate | 0.100 | |
| Malic Acid | 0.100 | |
| Locust Bean Gum | 0.025 | |
| FD & C RED #4 | 0.005 | |
| | 100.000 | |

| INGREDIENT SOURCES | | |
|---|---|---|
| Water | Distilled, Deionized | |
| Whole Strawberries | IQF | Smuckers |
| Fructose | Crystalline | Staley |
| Strawberry Juice Conc. | 42° Brix | Smuckers |
| Strawberry Flavor | #5291099 | Comax Manufacturing |
| Ascorbic Acid | | Pfizer |
| Kappa Carrageenan | Genugel UE | Hercules |
| Carboxymethylcellulose | #7H3SF | Aqualon |
| Guar Gum | SCM | TIC Gums |
| Potassium Sorbate | 20% Solution | Pfizer |
| Sucralose | 25% Liquid Concentrate | McNeil Specialty Products Co. |
| Pectin | Mexpectin SS200 | Grindsted Products |
| Sodium Hexametaphosphate | | Rhone Poulenc |
| Malic Acid | 50% Solution | Pfizer |
| Locust Bean Gum | #FL 50—50 | Hercules |
| FD & C RED | #40, 10% Solution | Crompton & Knowles |

Preparation Procedure

Equipment:
  High Shear Mixer
  Hot Plate Heating Apparatus

1. Combine IQF strawberries and fructose, heat slowly to boil stirring constantly, and hold for 1 minute.
2. Dry blend carrageenan, guar gum, carboxymethylcellulose, pectin, locust bean gum and sodium hexametaphosphate.
3. Dissolve dry blend mixture in boiling water using high shear mixer.
4. Add sucralose and sorbate solutions and coloring agents to the dissolved gums.
5. Add strawberry flavor and strawberry juice concentrate.
6. Add prepared strawberry/fructose mixture.
7. Add ascorbic and malic acids.
8. Standardize batch to 100% yield with water.
9. Hot fill into jars (165° F. minimum).

* Maintain constant agitation and minimum temperature of 165° F. throughout process.

What is claimed is:

1. A fruit spread having not more than 9 calories per teaspoon, said fruit spread comprising the gelled product of:
   a. water;
   b. fruit or fruit flavoring;
   c. sucralose high intensity sweetener;
   d. low methoxy pectin or carrageenan gelling agent;
   e. carboxymethylcellulose;
   f. guar gum; and
   g. locust bean gum.

2. The fruit spread of claim 1 wherein the fruit is grape and wherein the gelling agent is low methoxy pectin.

3. The fruit spread of claim 1 wherein the gelling agent is carrageenan.

4. The fruit spread of claim 3 wherein the fruit is strawberry.

* * * * *